United States Patent
Bonner et al.

(10) Patent No.: US 7,527,022 B2
(45) Date of Patent: May 5, 2009

(54) ANIMAL HABITAT AND DISPLAY SYSTEM

(75) Inventors: Ronald K. Bonner, Villa Park, CA (US); Eric R. Knudsen, Riverside, CA (US)

(73) Assignee: North American Pet Products, Corona, CA (US)

( * ) Notice: Subject to any disclaimer, the term of this patent is extended or adjusted under 35 U.S.C. 154(b) by 0 days.

(21) Appl. No.: 11/772,817

(22) Filed: Jul. 2, 2007

(65) Prior Publication Data

US 2007/0266958 A1    Nov. 22, 2007

Related U.S. Application Data

(63) Continuation of application No. 11/409,607, filed on Apr. 24, 2006, now Pat. No. 7,237,509, which is a continuation of application No. 10/979,917, filed on Nov. 2, 2004, now Pat. No. 7,032,540, which is a continuation of application No. 10/352,617, filed on Jan. 28, 2003, now Pat. No. 6,810,833.

(51) Int. Cl.
*A01K 31/10* (2006.01)

(52) U.S. Cl. .................................................... 119/481

(58) Field of Classification Search .................. 119/455, 119/452, 417, 418, 245–248, 253; 312/236
See application file for complete search history.

(56) References Cited

U.S. PATENT DOCUMENTS

| | | | | | |
|---|---|---|---|---|---|
| 3,738,323 | A | * | 6/1973 | Boterweg | 119/456 |
| 3,774,575 | A | * | 11/1973 | Patterson | 119/245 |
| 5,404,839 | A | * | 4/1995 | Mancuso | 119/246 |
| 6,810,833 | B2 | * | 11/2004 | Bonner et al. | 119/455 |

* cited by examiner

*Primary Examiner*—Thomas Price
(74) *Attorney, Agent, or Firm*—Advantage IP Law Firm

(57) ABSTRACT

An animal habitat and display system for housing and displaying at least one animal while selectively restricting access to the habitat is provided by an enclosure with a viewing window supported on a frame by a support element movable relative to the frame between a first position preventing access to an enclosure access panel and a second position providing access to the access panel with the frame being constructed to urge the access panel from an open position toward a closed position when the support element is moved from the second position toward the first position.

20 Claims, 10 Drawing Sheets

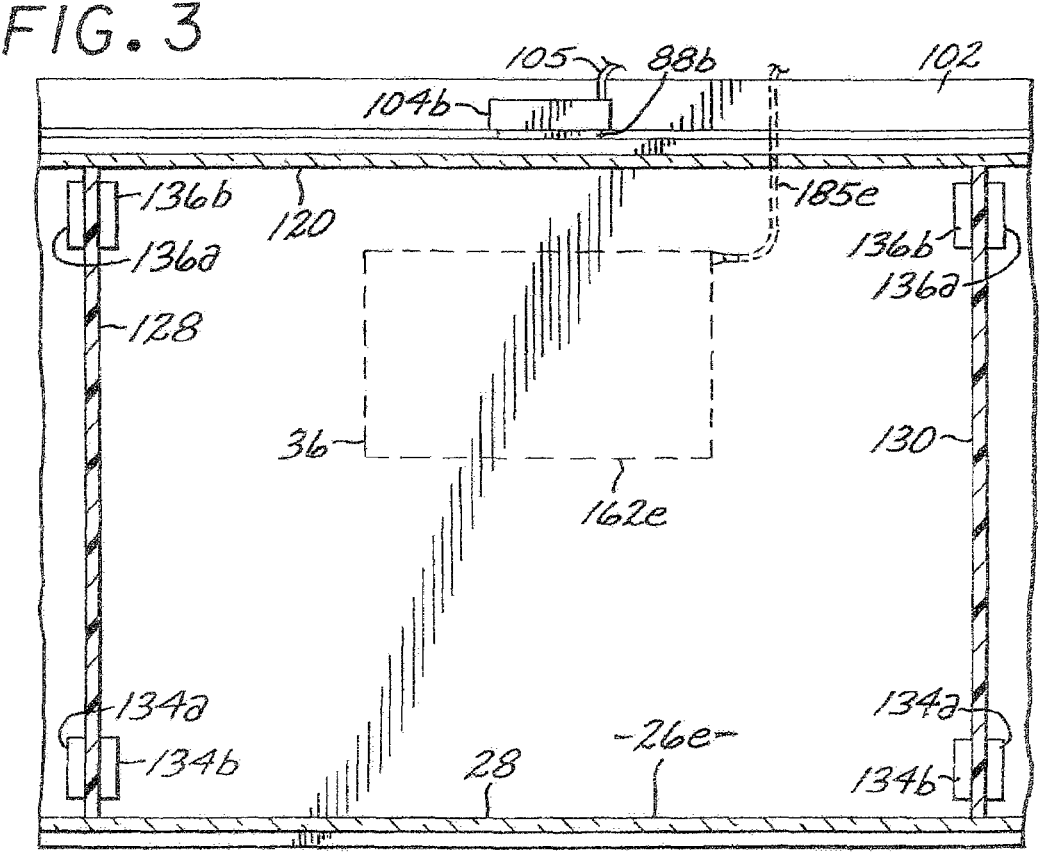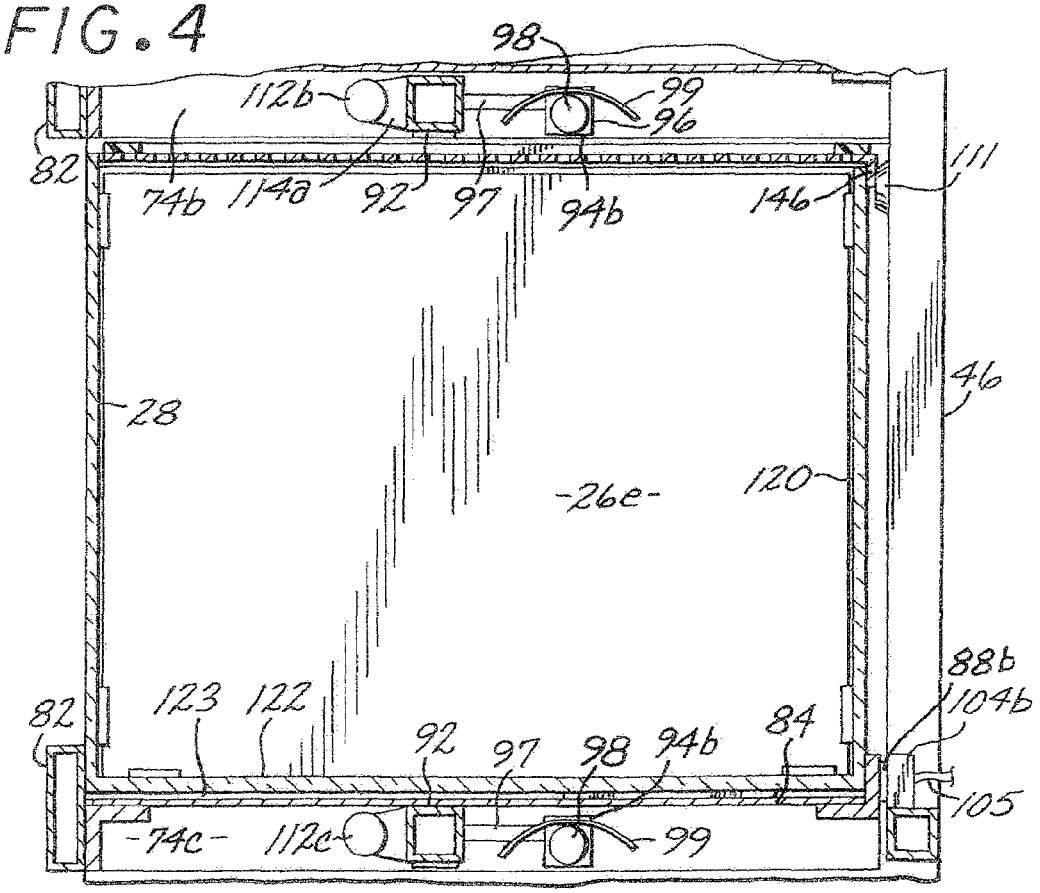

ANIMAL HABITAT AND DISPLAY SYSTEM

This is a continuation application of U.S. Ser. No. 11/409,607, now U.S. Pat. No. 7,237,509, filed on Apr. 24, 2006, which is in turn a continuation of U.S. Ser. No. 10/979,917, now U.S. Pat. No. 7,032,540, filed Nov. 2, 2004, which is in turn a continuation of Ser. No. 10/352,617, now U.S. Pat. No. 6,810,833, filed on Jan. 28, 2003, all of which are entitled Animal Habitat and Display System and incorporated by reference in their entireties.

BACKGROUND OF THE INVENTION

1. Field of the Invention

The present invention relates to the field of display devices, and more specifically, to display devices including a habitat for showcasing animals such as reptiles, amphibians, and other animals commonly sold in retail pet or specialty pet stores and controlling the environment of such habitat.

2. Background

For the pet store owner or other animal keeper, control of environmental conditions such as temperature, lighting, humidity, noise, food, air and water quality, animal waste and other environmental conditions, within and immediately surrounding the animal's habitat as well as controlling access for handling the animal are common concerns in maintaining a healthy animal. Cold-blooded animals, such as reptiles and amphibians, require even greater attention to temperature control as an especially critical component to the survival of the animal.

To house the animal, glass, acrylic, or plastic walled tanks are commonly used in retail and specialty pet stores as both in-store displays and living quarters for all kinds of animals including rodents, reptiles, birds, cats, dogs, fish, and other commonly sold pets. The tanks frequently include a heating element such as a hot rock or heating pad, a light, a substrate, water, food, and other environmental features. A thermometer is often placed inside the tank at a convenient location visible to the animal caretaker to monitor the tank temperature. Such tanks provide a habitat for the animals during their stay in the store.

Often such tanks are placed on a stand and placed in a high traffic area of the store enabling prospective customers to view the animal or animals. Given that pet store owners may have a relatively large inventory with limited floor space, the use of single cage displays is often limited to select animals or avoided altogether. Because of the limited store space, more often the tanks are arranged in some sort of stacked relationship on a display rack. Normally, access to the animal is either provided from a room behind the rack where the store employee may enter or the store employee may access the tank from the front. In either case, the tank typically includes a removable top lid which must be held up or placed aside while the animal handler attempts to handle the animal. This often results in the animal escaping as the handler must hold the lid with one hand or having removed the lid completely to place his or her arm inside the tank to grab the animal, the removed lid leaves a large opening through the animal may escape. In addition, the ease in which the animal may be accessed by merely lifting a lid leaves the store owner prone to theft. Some display tanks may include a key lock system to secure access to the tank and thus the animal. Each tank may have its own lock or the lock may restrict access to a number of tanks. Keys are then distributed to store personnel. Thus, when an animal handler desires to show an animal to a prospective customer or otherwise handle the animal, a key is produced to unlock the lid to the tank. This still leaves the store owner prone to theft from ex-employees with keys and there is no accountability as to which employee opened the tanks. For instance, keys are easily duplicated and anyone with a key may access the tank. One employee may easily blame another employee. In addition, the expense of changing a lock every time an employee is terminated incurs an unnecessary expense on the employer. Moreover, even without a key it is not uncommon for a thief to merely force the lock open without undue effort.

In addition to the concerns of displaying the animals in limited store floor space and controlling the access and handling of the creatures, control of other environmental conditions is difficult in a multi-tank display. The difficulty of managing the heat control increases as display tanks are placed proximate to one another. In simple set ups, an in-tank heater such as a heat rock, which is a heating element covered by a simulated rock-like cover, is placed in the animal tank and plugged into a nearby power source. Many heat rocks simply warm to a particular temperature while some allow the operator to vary the temperature somewhat. In either case, the owner runs the risk of burning the animal if it is exposed directly to the heat rock for too long. In addition, such rocks may not distribute heat evenly creating similar burn concerns.

Moreover, the proximity of the tanks increases the difficulty of controlling the temperature as heat created in the lower tanks rises to the upper tanks. As typically some sort of lighting and heating system must accompany each tank or display, the tendency of heat transferring from one tank to another due to lighting equipment and heating equipment in a closely spaced display system results in inadequate temperature stability and control often resulting in the death of the animals, especially when the animals are left unattended.

Thus, one common practice is to space the tanks relatively far apart. This arrangement, however, wastes display space and lengthens the wiring requirements for lighting and heating power cords. In addition, each of the heating and lighting elements is typically connected to a single outlet panel controlled by a switch and thus individual control of the environmental controls of the tanks is not attainable.

Another environmental concern arises when the animals are left unattended, such as, during off hours in which the environmental conditions in the store may change significantly. For example, nighttime temperatures may drop drastically if the heating system controlling the store temperature fails. Such change in the ambient temperature surrounding the animal habitats affects the temperature in the habitats which are not isolated from the ambient air. On the other extreme, during higher temperature ambient conditions, the store air conditioning system can cease functioning properly. In such situations, the animals are placed at great health risk as the ambient temperature and thus tank temperature rises.

As the health of the animals as both an asset to the store and a concern of the animal care taker is a serious concern, controlling the habitat environment, including access to the habitat, are paramount concerns in order to run a successful business or animal care taking facility such as a veterinarian's office and is something which conventional animal habitats fail to satisfactorily provide.

Thus, what is needed and heretofore unavailable is a more efficient multiple display case system with improved animal handling characteristics and improved environmental control features while deterring theft and providing access accountability.

SUMMARY OF THE INVENTION

In accordance with a preferred embodiment of the present invention, the animal habitat and display system may be provided in an enclosure defining a compartment with a viewing window for housing and displaying at least one animal with an access panel defining at least a portion of the enclosure in a closed position and movable relative to the enclosure to an open position for gaining entry into said compartment and a frame including at least one support element supporting the enclosure, the support element being movable relative to the frame between a first position preventing access to the access panel and a second position providing access to the access panel, the frame being constructed to urge the access panel from the open position toward the closed position when the support element is moved from the second position toward the first position.

In one aspect of the present invention, the access area into the compartment is provided near the leading edge of the compartment so as to direct the animal's escape path toward the user.

In another aspect of the present invention, the support element includes a tray supported by a pair of opposing telescopically extending guide rails with rail guards extending in a manner so as to prevent debris from entering and fouling the rails.

Other aspects of the present invention will become apparent with further reference to the following drawings and detailed description.

BRIEF DESCRIPTION OF THE DRAWINGS

FIG. 3 is a top sectional view, in enlarged scale, taken along lines 3-3 of FIG. 1;

FIG. 4 is a cross-sectional view, in enlarged scale, taken along lines 4-4 of FIG. 1;

DETAILED DESCRIPTION OF THE PREFERRED EMBODIMENTS

Figure 1:
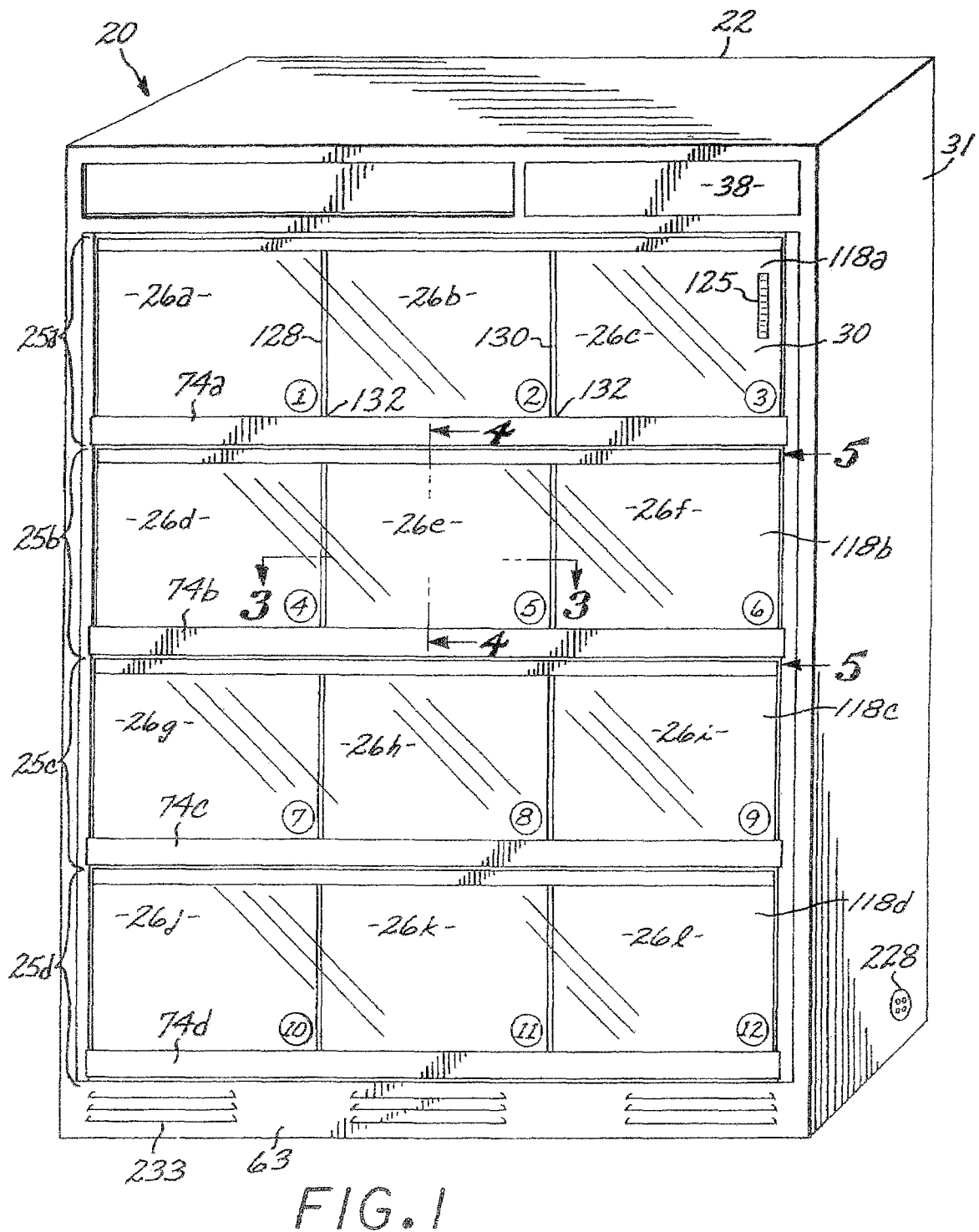
FIG. 1 is a right front perspective view of a preferred embodiment of an animal habitat and display apparatus in accordance with the present invention.

Referring now to FIGS. 1-2, 7, and 14, an exemplary embodiment of an animal habitat and display system with environmental controls, generally designated 20, of the present invention is illustrated. In general, such habitat and display system is provided in a frame 22 supporting at least one set of guide rails 24a, 24b on which a drawer 25a is slidably supported so that the drawer may be extended and retracted relative to the frame. The drawer includes at least one compartment 26a, 26b, or 26c with a front wall 28 defining a window 30 and at least one wall 32 movable relative to the compartment so the compartment may be accessed. An internal environment 34 is defined by the compartment and may be regulated with a regulator element 36 (FIGS. 2 and 3) in communication with the internal environment and is selectively operable through a control panel 38 connected to an environmental control unit, generally designated 40 (FIGS. 11-13), in electrical communication with the regulator element.

Figure 7:
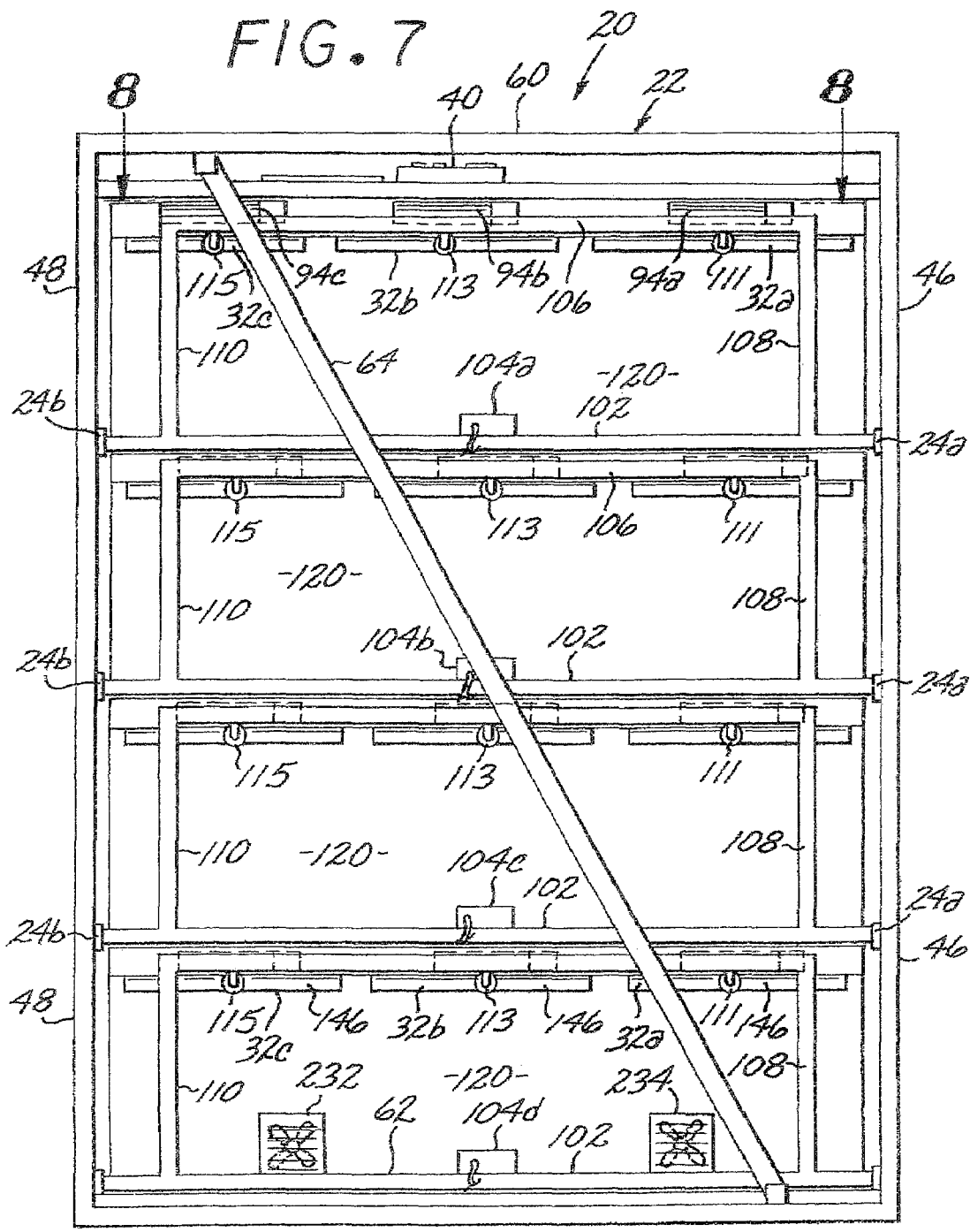
FIG. 7 is a rear view of the preferred embodiment of the animal habitat and display system illustrated in FIG. 1.
Figure 14:
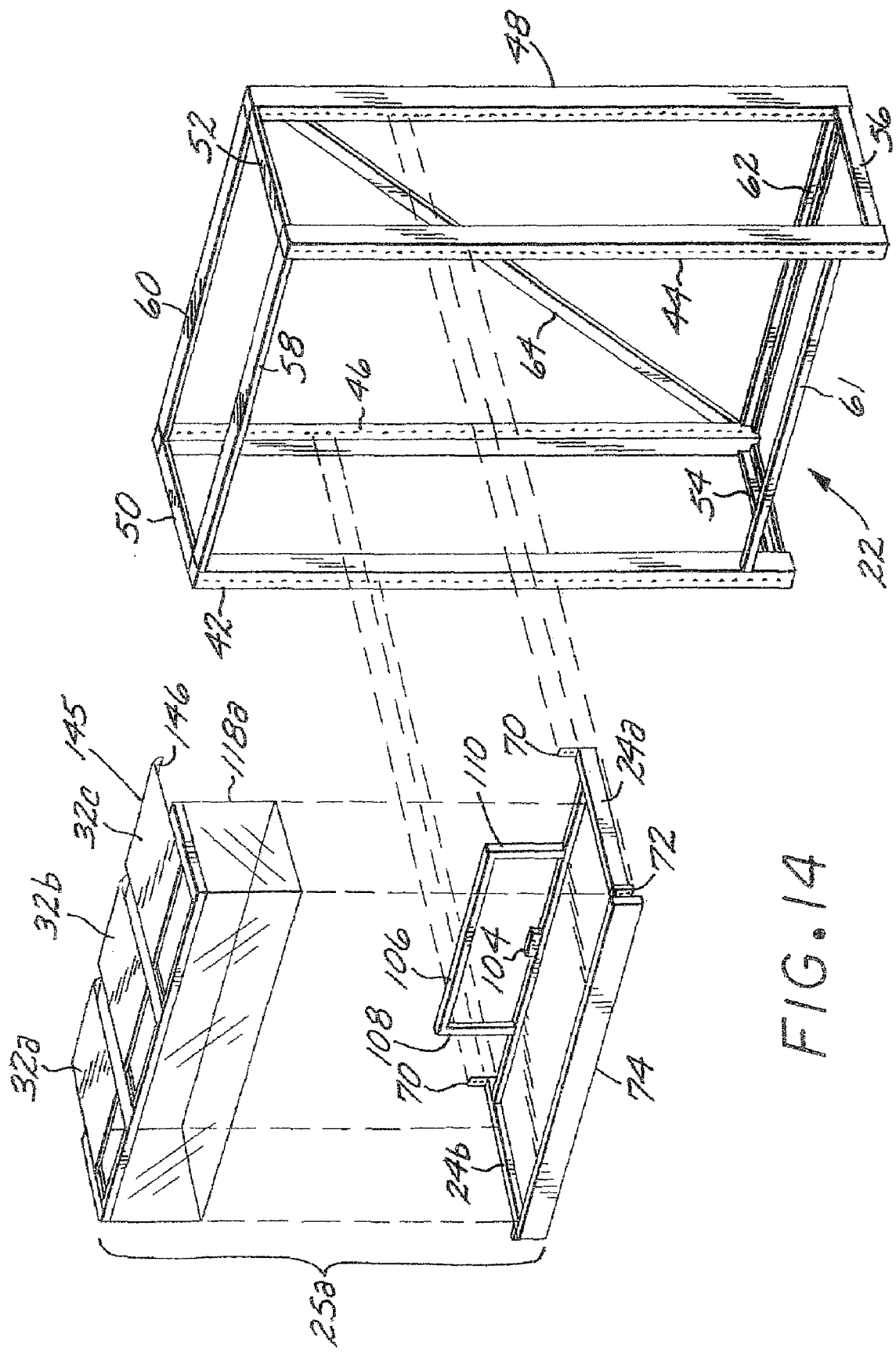
FIG. 14 is a right front perspective, exploded view, in reduced scale of the frame, guide rail, and drawer assembly of the animal habitat and display apparatus illustrated in FIG. 1.

With particular reference to FIGS. 7 and 14, forming the support structure for the display system, the main frame assembly 22 is a generally rectangular open structure having four upright rack rails including a left front rack rail 42, a right front rack rail 44, a left rear rack rail 46 and a right rear rack rail 48 corresponding to each corner of the frame. A pair of left and right upper horizontal supports 50 and 52 and a pair of left and right lower horizontal supports 54 and 56 connect the front rack rails with the rear rack rails along the short ends of the frame.

In addition, the top ends of the front left rack rail and front right rack rail are connected by a front upper brace 58 and the top ends of the rear left rack rail and rear right rack rail are connected by a rear upper brace 60, with both braces 58 and 60 spanning the width of the frame 22. A front lower brace 61 is connected to the left front rack rail 42 and right front rack rail 44 slightly above their respective bottom edges. This brace 61 is preferably removably secured to the frame to provide ease of access underneath the frame. A rear lower brace 62 projects horizontally between the left rear rack rail 46 and right rear rack rail 48 along the lowermost edge of the framework. A diagonally projecting reinforcement brace 64 spans from the upper end of the right rear upright support 48 to the lower end of the left rear upright support 46 strengthening the integrity of the frame. An alternative location for the diagonal brace 64 is illustrated in FIG. 7.

The frame members 42-64 may be secured together using conventional fasteners, welded together, or with other suitable fastening means. The footprint of the frame in this exemplary embodiment is 24 inches deep by 52 inches wide. Other suitable dimensions will occur to those of ordinary skill in the art. The frame 22 provides a convenient mounting structure for a number of drawers as well as the environmental support equipment. A panel skin 31 may cover the frame members to provide a more pleasing appearance as illustrated in FIG. 1.

In this exemplary embodiment, four drawers designated 25a-d (FIG. 1) from top to bottom are supported by the frame. As each of the four drawers is similarly structured and similarly mounted to the frame at various locations along its height, an exemplary drawer will now be described.

Figure 2:
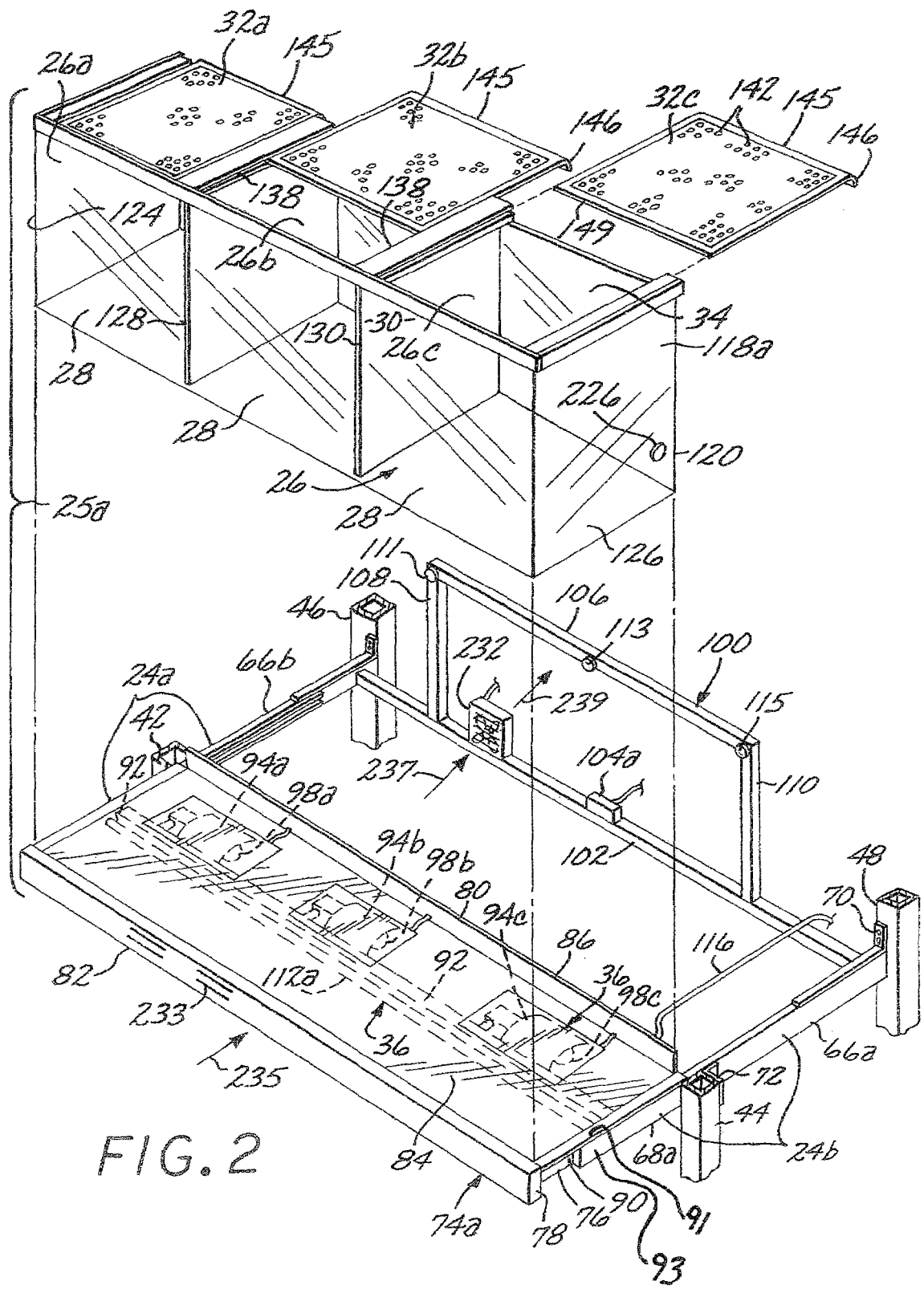
FIG. 2 is partial, exploded view, in enlarged scale, of a drawer, in an extended position, and partial frame of the embodiment illustrated in FIG. 1.

Referring now to FIGS. 1-2, an exemplary top drawer 25*a* is slidably mounted to the frame 22 by a pair of left and right opposing guide rails 24*a* and 24*b* fixedly secured to the frame. Each guide rail 24*a*, 24*b* includes a rear slide bracket 66*a*, 66*b* and a forward slide bracket 68*a*, 68*b* (only slide bracket 68*a* is visible in FIG. 2). The right rear slide bracket 66*a* is secured between the right rear upright 48 and right forward upright 44 using suitable fasteners through respective rear and forward anchor flanges 70 and 72 or with a suitable weld fixing the rear slide bracket to the frame. The forward slide bracket 68*a* is carried on the rear slide bracket 66*a* and is constructed to slide along its length in a telescopic arrangement with the rear slide bracket. The left slide brackets are similarly attached to the left rear and left forward uprights 46 and 42 and are mounted in vertical alignment with the opposing right slide brackets.

Figure 5:
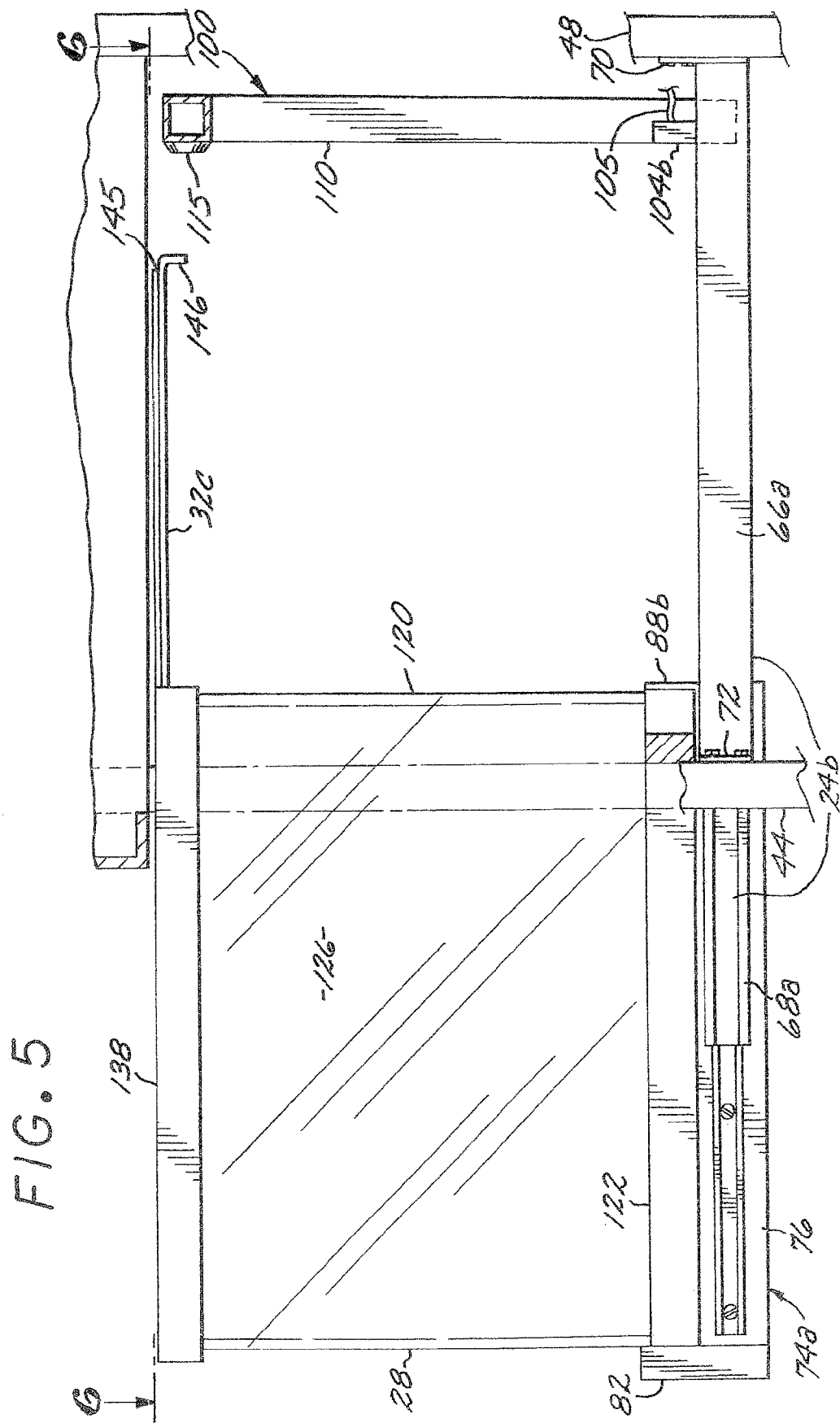
FIG. 5 is a cross-sectional view, in enlarged scale, taken along line 5-5 of FIG. 1 illustrating a drawer of the animal habitat and display system as illustrated in FIG. 1 but with the drawer in an extended position as illustrated in FIG. 2.

Turning to FIGS. 2, 5, and 7, a drawer locking and closing assembly, generally designated 100, is secured between the opposing rear slide brackets 66*a*, 66*b*. Such assembly includes a cross beam 102 welded at opposite ends to the inside surfaces of the left and right rear slide brackets 66*a*, 66*b*. Mounted at a midpoint along the cross beam is a forwardly facing plate 104*a* of the magnetic locking system. The forwardly facing plate 104*a* is connected via wiring 105 to the environmental control unit 40 to control the unlocking and locking of the magnetic locking assembly or maglock as will be described below. An elevated cage lid closing bar 106 is mounted to a pair of left and right uprights 108, 110 welded or other secured to the cross beam 102. Inwardly facing left, right, and middle bumpers 111, 113, and 115, respectively, are carried from the closing bar, face forwardly, and are vertically aligned with the three lids of the respective tanks on the top drawer 25*a* to assist in closing the respective lids as the drawer is pushed shut or retracted into the frame on the guide rails 24*a*, 24*b* as will be described below in more detail.

With continued reference to FIGS. 1, 2, 7 and 14, mounted to each opposing forward slide rail 68*a* (68*b* not shown) is a rectangular pull-out tray or shelf 74*a* upon which compartment 26 rests. In this example, there are four such shelves 74*a-d* corresponding to four drawers 25*a-d*. Together, the tank 118*a*, its compartments 26*a-c* and shelf 74*a* cooperate to form the respective drawer 25*a*. With particular reference to FIGS. 2 and 14, the short sides 76 of a rectangular upper shelf 74*a* are fixedly mounted to the respective left and right forward slide brackets 68*a* and 68*b* providing a shelf that may be moved relative to the frame 22 and fixed rear slide brackets 66*a*, 66*b*. It is also contemplated that the short sides of the shelf could provide another rail extension to allow the drawer to pull out further from the frame. The upper shelf 74*a* spans the gap between the opposing upper guide rails 24*a*, 24*b* and provides upper and lower support surfaces for supporting the tank 118*a* and its compartments 26*a-c* and mounting electrical components such as the lighting components for regulating light within the tank internal environments.

The upper shelf includes spaced apart, front and rear cross supports 78 and 80 secured to the inside surface of the respective left and right front slide brackets 68*a*, 68*b*, respectively. A front aesthetic cover 82 with vents 233 (FIG. 2) is secured to the front facing of the front cross support 78. A wire mesh 84 spanning the transverse width of the shelf overlies these supports and may be covered partially or entirely by an insulating pad 123 (FIG. 4) to absorb or deflect some of the heat from the lighting components away from the tank supported above on the shelf. The rear cross support 80 includes an upwardly turned flange 86 projecting along its length with a rearwardly facing plate 88 (FIG. 3) of a magnetic lock assembly secured thereto in a rearwardly facing configuration at a vertical level just above the rear cross support 102 and at a midpoint of the cross support 80 length and aligned with the forwardly facing maglock plate 104 on the cross support 102 (FIG. 2). Advantageously, the short ends 76 of the shelf 74*a* include an L-shaped rail guard or shield 90 with one portion 91 projecting horizontally over and extending beyond the outermost lateral edge 93 of the front slide bracket 68*a* that is located inside the interior surface of the upright 44 such as that shown in FIG. 2 to prevent debris such as animal bedding or other contaminants from fouling up the guide rails 24*a*, 24*b*. It will be appreciated as shown in FIG. 2 that such rail guard 90 does not interfere with the extension or retraction of the shelf.

Figure 8:
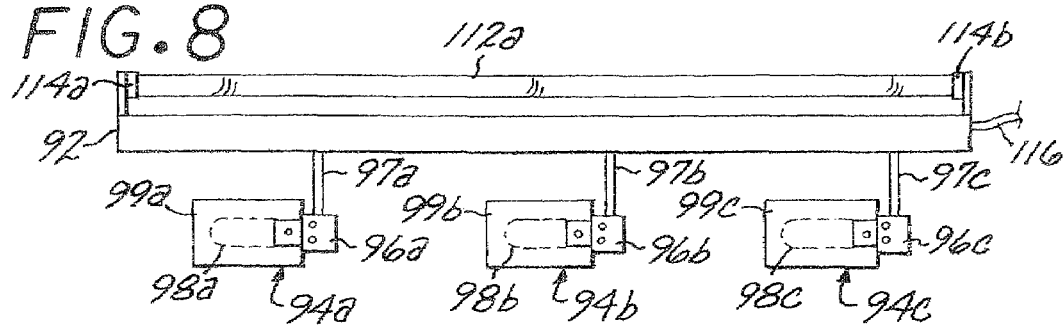
FIG. 8 is a cross-sectional top view, in enlarged scale, taken along lines 8-8 of FIG. 7.

With reference to FIGS. 2, 4, and 8, projecting along the length of the shelf between the front and rear cross supports 78 and 80, respectively, is an elongated lighting assembly which includes an electrical conduit 92 secured to the inside surface of the left and right front slide brackets 68*a*, 68*b*, respectively. Mounted to the conduit using conventional fasteners is left heat lamp assembly 94*a*, central heat lamp assembly 94*b*, and a right heat lamp assembly 94*c* projecting toward the rear cross support 80. The left heat lamp assembly 94*a* is representative of the other two heat lamp assemblies and includes a bulb socket 96*a*, a heat lamp bulb 98*a* preferably rated from 15 Watts to 40 Watts provides a radiating heat transfer energy source, and a downwardly facing, semi-cylindrical, reflective heat shield 99*a*, to deflect heat in a downward and outward direction. The socket 96*a* is connected to the main conduit 92 with a short projecting mini-conduit 97*a*. The central and right heat lamp assemblies 94*b*, 94*c* are constructed in a like manner.

On the forward facing side of the conduit 92, a longitudinally projecting fluorescent lamp 112*a*, is secured between opposing sockets 114*a*, 114*b* secured to the conduit. The wiring for each of the heat lamp assemblies and the fluorescent lamp are carried within the conduit and directed out of a slot in the right side in a wiring harness 116 toward the open rear of the frame 22. The wiring harness is then connected to the electrical circuit on the top of the frame 22 where the environmental control unit (ECU) 40 may be placed. For maintenance reasons, the conduit 92 may include a removable top so a repair technician can access the wiring within. It will also be appreciated that the removable wire mesh 84 facilitates maintenance of the lighting assemblies 94*a-c*. The mesh also facilitates movement of air about the light sources to assist in controlling the heat flow about the tanks. The other shelves are constructed in a similar manner so that the lighting assembly connected to a particular shelf services the tank 118*a*, and internal environments directly below the shelf supporting the lighting components. A top lighting assembly above the top drawer 25*a* may be fixed to the frame or constructed as an independent shelf.

With reference to FIGS. 2 and 14, resting atop the shelf 74*a* is a tank 118*a* having a front wall 28, rear wall 120, a bottom wall 122 and opposing left and right walls 124 and 126 cooperating to form a generally rectangular compartment 26*a*. The front, bottom, and rear walls span the width of the shelf 74*a* from the left side to the right side while the opposing side walls span the depth of the shelf from the front to the back of the shelf. The respective walls are typically held together where the edges meet by a suitable sealant and may be otherwise reinforced. The bottom wall 122 of the tank may be secured to the shelf using suitable fasteners or adhesives or merely rest on top of the shelf. The tank is preferably constructed of a transparent material such as glass, acrylic, plastic or other suitable material. At least a portion of the front wall is transparent to form a window 30 allowing potential customers or viewers to observe the contents within the compartments 26a-c. The front wall of the tank may include an in-tank thermometer 125, as exemplified in compartment number three 26c in FIG. 1, adhered to the inside surface of the front panel 28 and visible through the window 30. An animal care talker can easily view the thermometer to take a reading of internal habitat temperature. Such thermometer is for visual readings only and is not connected to any electrical circuitry. An in-tank thermometer that is connected to the environmental control unit will be described below.

With reference to FIGS. 3 and 4, in between the bottom wall 122 of the tank and wire mesh 84 is a heating pad, generally designated 162e, that may provide a conductive heat source and is coupled to an electrical environmental control unit 40 (FIG. 12) as will be described below. Preferably, the insulating pad 123 (FIG. 4) is placed between the heating and the wire mesh to deflect some of the heat generated by the lighting component in the tray from overheating the compartment directly above. A heating pad 162a-l may be placed in each respective compartment 26a-l if desired.

Referring now to FIGS. 1-2, in this exemplary embodiment, left and right dividers 128, 130, respectively, subdivide the tank into three equal sized discrete sub-compartments 26a, 26b, and 26c, respectively, or cages. The left divider 128 includes a bottom end 132 held in place by a pair of forward opposing stops 134a, 134b and rearward stops 136a, 136b adhered or otherwise suitably secured to the bottom 122 of the tank near the front and back walls 28 and 120, respectively. It will be appreciated that the dividers could be spaced at different locations within the tank to form compartments of unequal size. In addition, no dividers, one dividers, or a greater number of dividers could be used to form varying compartment configurations. It will further be appreciated that such dividers, being in contact with the internal environments of adjacent compartments, may inherently conduct some heat from one compartment to another.

Figure 9:
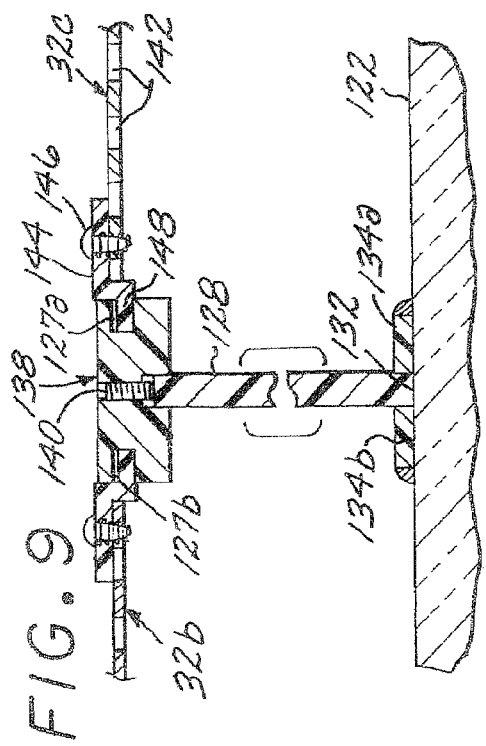
FIG. 9 is a cross-sectional view, in enlarged scale, taken along lines 9-9 of FIG. 6.

At the top end of the left divider 128, is a generally I-shaped, when viewed in transverse cross section as illustrated in FIG. 9, mounted lid guide 138 screwed into the top of the divider with a set screw 140. Intermediate lid guides, that is, lid guides not located on the side walls 124 or 126 include opposing laterally facing slots 127a, 127b. The lid guide 138 and its respective slots 127a, 127b project along the length of the divider 128 from the front wall 28 of the tank to the rear wall 120. The side walls 124 and 126, respectively, of the tank include half section lid guides (not shown) with a single slot facing inwardly toward the tank. The dividers are the same height as the side walls 124 and 126, respectively. The right divider 130 is constructed in a like manner.

Figure 6:
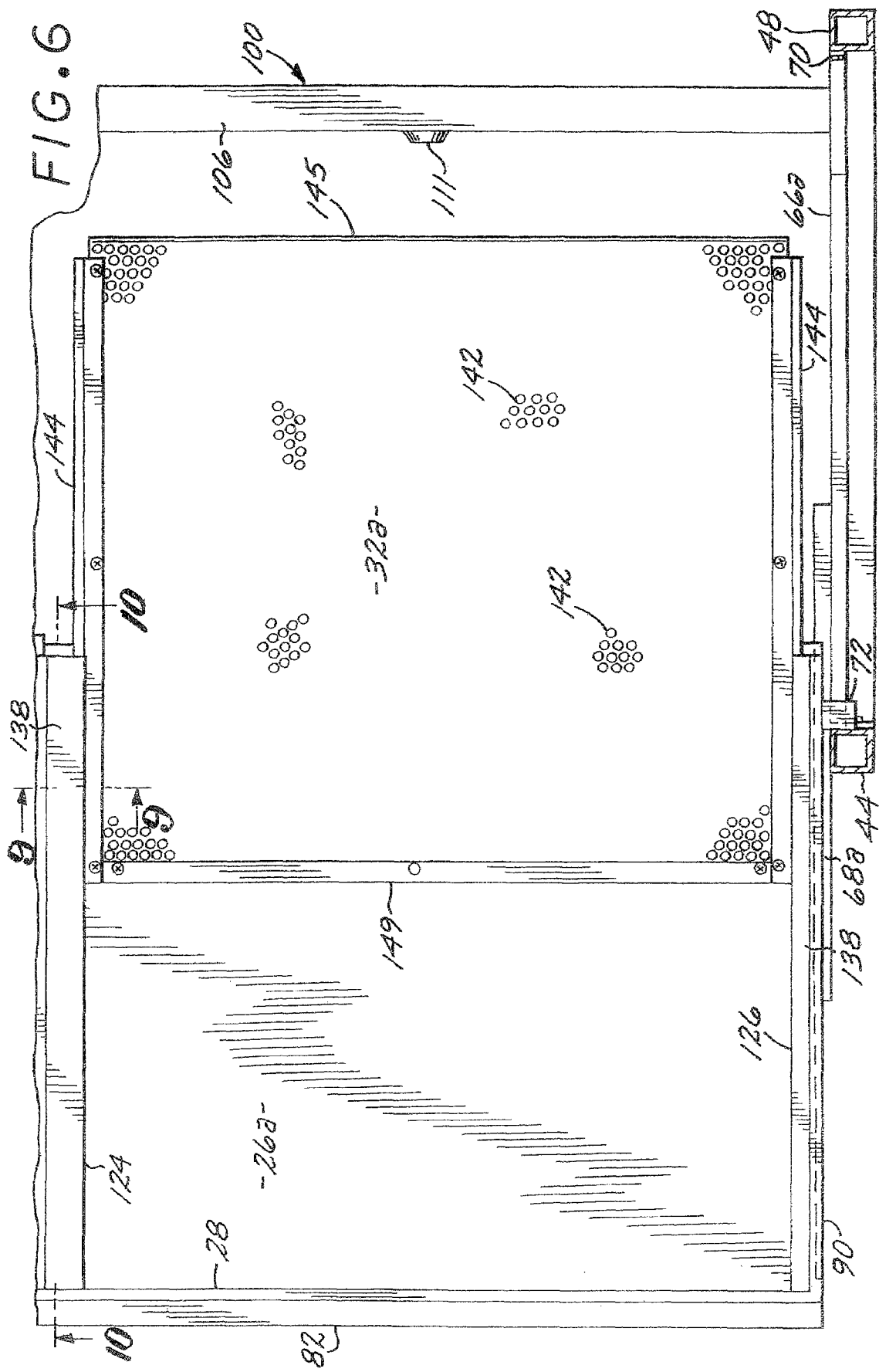
FIG. 6 is a cross-sectional view top view, in enlarged scale, taken along lines 6-6 of FIG. 5.

Referring now to FIGS. 2, 6, and 9, the top wall 32 of the tank 118a is in the form of a discrete, three piece, movable lid 32a, 32b, and 32c. Thus, there is one lid corresponding to each compartment 26a, 26b, and 26c. Each lid is perforated with holes 142 to allow air outside the compartment to exchange with air in the internal habitat environment. One lateral side of the right end lid 32c is illustrated in FIG. 9 and includes a horizontally projecting rail 144 secured to the lid 32c by a screw or other suitable fastener 146. From the lateral outer edge of the lid 32c, the rail 144 bends downwardly and then outwardly to form an L-shaped rail. The outwardly extending flange 148 of the rail is inserted into the slot 127a to slide thereon. Each lid is constructed alike. Thus, each lid slides between adjacent, opposing rail guides and may be moved relative to the tank to open the top region of the tank to access the internal environment and animal in the compartment. The lids are preferably movable in a rearward direction by pushing the front edge 149 of the lid rearwardly when the drawer 25a is pulled out from the frame 22. The lids are preferably sized to close off the entire top opening of the tank 118a. The back end 145 of each lid includes a downwardly facing bumper flange 146 at a horizontal level aligned with the respect bumpers 111, 113, and 115 of the opposing cross beam 106.

Figure 10:
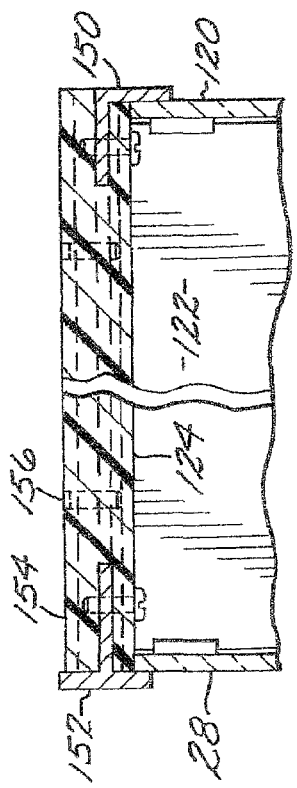
FIG. 10 is a cross-sectional view, in enlarged scale, taken along lines 10-10 of FIG. 6.

Referring now to FIG. 10, an outwardly facing cross sectional view of the tank construction including reinforcement construction is illustrated. The side wall 124 is further secured to the rear wall 120 by an L-shaped angle bracket 150. The front wall 28 is secured to the side wall 126 with a T-shaped bracket 152 with the short end of the "Tee" facing forwardly and the long end of the "Tee" running parallel and alongside the side wall 124. A side cover panel 154 is screwed into the underlying support bracket with a screw 156 or other suitable fastener.

Likewise, an upper intermediate drawer 25b, lower intermediate drawer 25c and bottom drawer 25d including tanks 118b-d, respectively, are separated into three compartments 26d-f, 26g-i, and 26j-l, respectively, in this example, and supported on a shelf 74b-d, respectively, which is mounted to the frame 22 on respective sets of upper intermediate guide rails, lower intermediate guide rails, and bottom guide rails (FIGS. 1 and 7). Thus, in this example, the animal habitat and display system includes four drawers 25a-d from top to bottom with four sub-divided tanks 118a-d forming 12 discrete compartments, designated 26a-l and corresponding with compartment numbers 1-12 (FIG. 1).

Each compartment 26a-l includes its own habitat environment having environmental conditions measurable by sensors such a heat, light, humidity and the like. The sensors may measure parameters defining characteristics of the environmental conditions within the environment. For example, the temperature sensor 226 (FIG. 2) may sense a temperature from which temperature of the internal environment may be determined either manually or via the environmental control unit described below to sense an overheat condition or otherwise.

Figure 12:
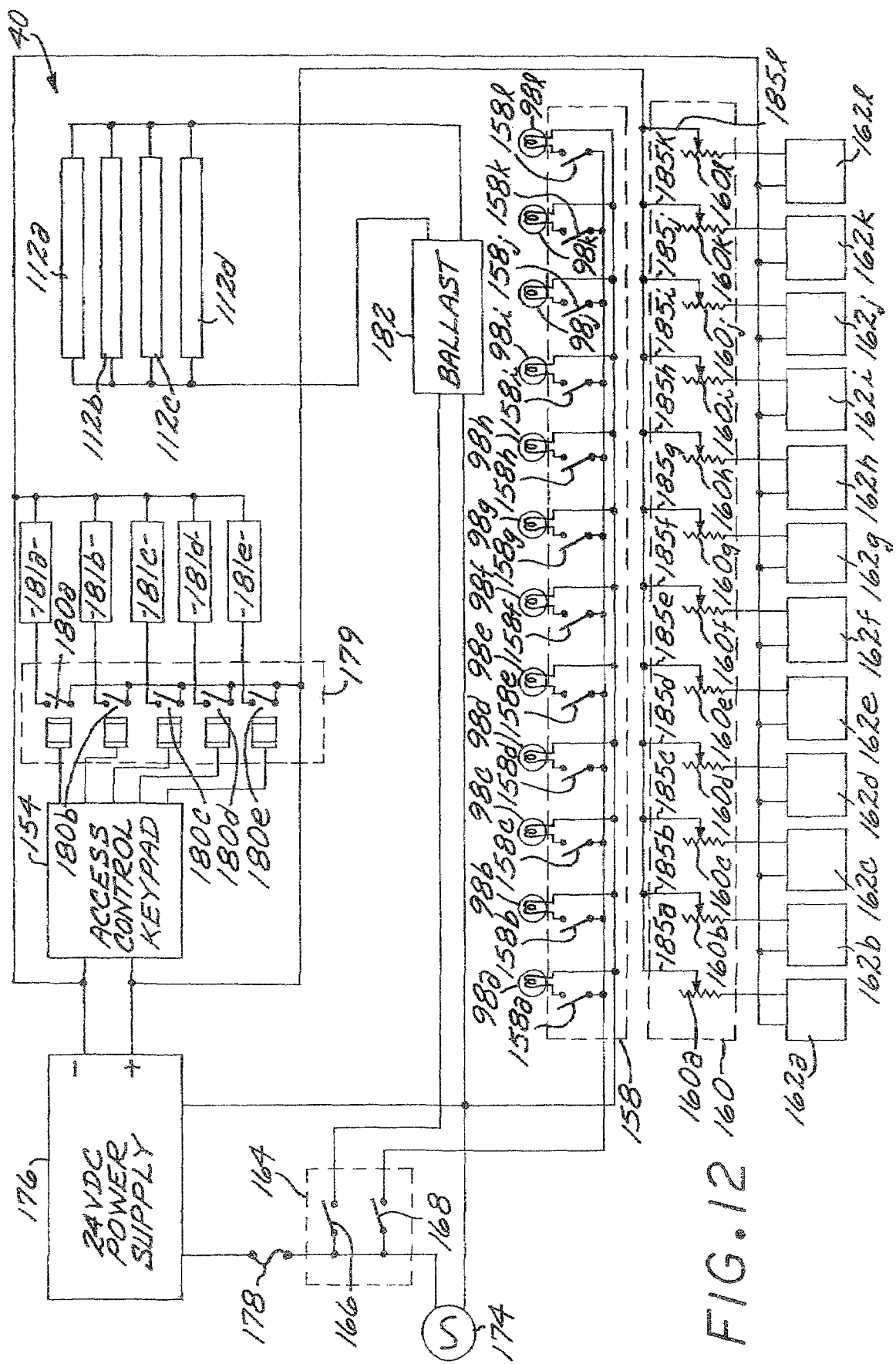
FIG. 12 is a schematic of an exemplary wiring diagram illustrating the environmental control system in accordance with a preferred embodiment of the present invention.

Furthermore, with reference to FIGS. 1, 2, and 12, each drawer 25a-d and its corresponding compartments 26a-c, 26d-f, 26g-i, and 26j-l, respectively, may be illuminated by fluorescent lights 112a-d, respectively. A heat lamp 158a-l and a heating pad element 162a-l are assigned to each compartment 26a-l, respectively. Each of the fluorescent lights 112a-d, heat lamps 98a-l, and heating pads 162a-l are positioned in close proximity with said corresponding compartment 26a-l, respectively, to regulate a condition such as light and heat within the associated internal environment 34a-l, respectively. These temperature and light regulating components 112a-d, 98a-l, and 162a-l are wired to the environmental control unit 40 as will be described below in more detail for selectively controlling the internal environment of each tank. The term regulation, as used herein, in addition to its plain meaning, encompasses changing, stabilizing, influencing, adjusting, and/or controlling. Due to construction similarities between the drawers, guide rails, and their respective components, like components have been like numbered. This four by three configuration with twelve discrete compartments is not meant to be limiting in any manner and other configurations will not depart from the scope and spirit of the present invention.

As shown in FIG. 7, an auxiliary overtemp fan 232 and a second auxiliary fan 234 are mounted to the bottom cross brace 62 using conventional fasteners. These fans may be wired to the environmental control unit and controlled thereby. In FIG. 2, the auxiliary fan 232 is mounted at an alternative location to the cross bracket 102 of the drawer closing and locking assembly. Such fans contribute to alternative forms of cooling by drawing air from the front of the system 20 through vents 233 to the open rear of the frame 22. It will be appreciated that some inherent passive convective heat transfer will occur due to a difference in the temperature of the air proximate and within the frame and compartments due to heat produced by the electrical components of the system and the surrounding ambient air. Thus, such fans may be selectively actuated to actively provide favorable heat transfer characteristics such as increased cooling by removing the heated air from around the frame components and drawing in cooler ambient air.

Figure 11:
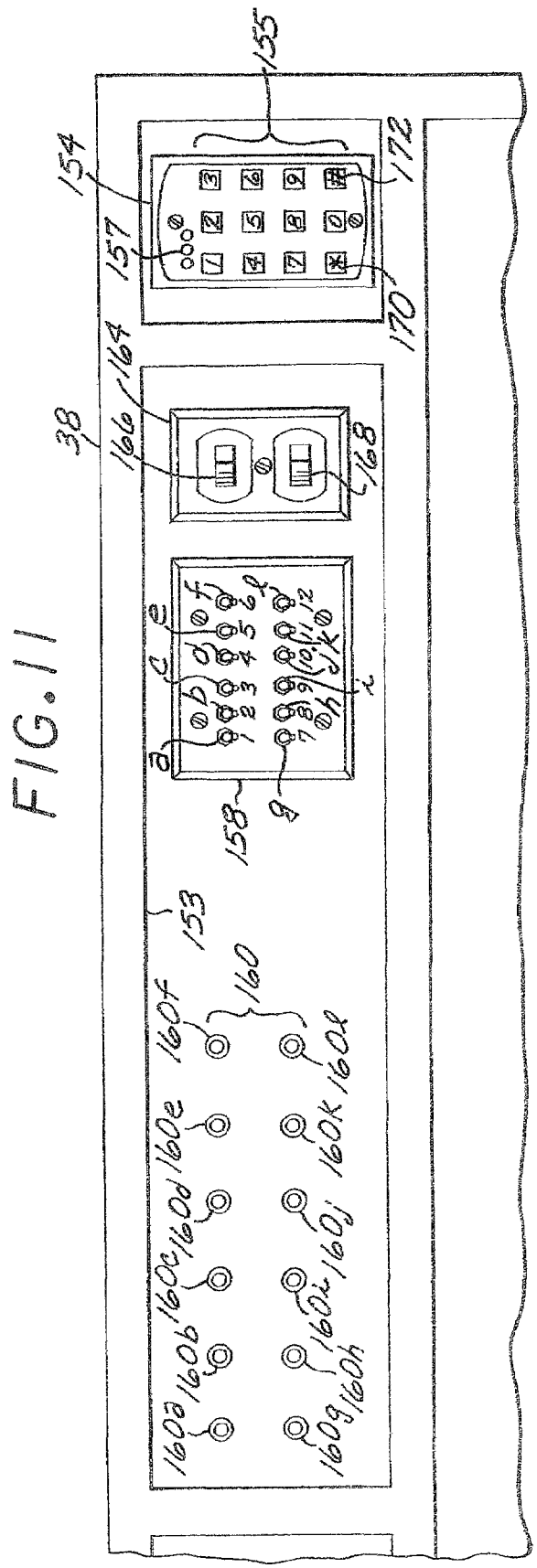
FIG. 11 is a front sectional view, in enlarged scale, of the control panel of the preferred embodiment of the animal habitat and display system illustrated in FIG. 1.

Turning to FIGS. 1, 11, and 12, an exemplary control panel 38 is illustrated. The control panel generally includes a switch control section 153 and a keypad 154. The switch control section includes a set of 12 dual position, heat lamp switches designated 158a-l positioned in two rows of six switches in vertical alignment near the middle of the control panel forming a heat lamp switch bank Each heat lamp switch corresponds to a particular heat lamp and may turn the lamp on or off. Conveniently, the heat lamp switches are labeled 1-12 to correspond with the particular compartments 1-12.

As viewed in FIGS. 11 and 12, to the left of these heat lamp switches 158 is a set of two rows of six variable control heating pad switches, designated 160a-l, respectively. Each switch is connected to a corresponding heating pad in the corresponding tank number 1-12 forming a heating pad switch bank. These switches may be rotated to change the desired temperature of the variable temperature heating pads 162a-l, respectively. As for the heat lamp switches, the heating pad switches are labeled 1-12 for like reasons.

To the right of the heat lamp switches 158 is a master switch panel 164 including a dual position, master fluorescent light switch 166 positioned above and in vertical alignment with a dual position, master heat lamp switch 168. As will be explained below each of these switches may turn on or off the entire associated fluorescent lamps or heat lamps.

Positioned to the right of the master switch panel 164 is the keypad 154 in the form of a conventional ten key with a set of keys 0-9 155 and an additional star key 170 and a pound key 172. The keypad is used to store employee codes and controls entry of the drawers 25a by releasing the maglocks 88, 104 from one another to control access to the drawer contents as will be described below. A LED indicator 157 is also provided to indicate successful code entry and/or drawer open status. A preferred keypad is available from Quantum in the United Kingdom.

Referring now to FIGS. 11 and 12, an exemplary electrical circuit associated with the environmental control unit 40 according to a first embodiment of the invention for providing access and environmental controls is illustrated. An AC power source 174 such as a conventional wall outlet provides power to the master switch box connected using a conventional plug and cord to a switch box 164 including the master fluorescent light bank switch 166 and master heat lamp bank switch 168. In series with the switch box 164 is a 24 volt direct current power supply 176 for supplying power to the DC components, that is, the maglocks 88, 104 and the heating pads 162a-l. The fans 232, 234 may also be DC powered. A safety fuse 178 is disposed in the circuit between the switch box 164 and DC power supply 176. The power supply provides DC power to the programmable keypad 154, which controls the access control relay board 179 including a series of relays 180a-d for individually activating and deactivating the maglock units 181a-d, respectively, associated with each drawer 25a-d, respectively. Relay 108e and maglock 181e are spares for configuration growth.

In addition, the 24 VDC power supply is in series with the electrical heating pads 162a-l for each tank through respective variable heat resistors switches 160a-l controllable through the interface control panel 38. The heating pads are typically 40 square inches run at 24 VDC with 38 Ohm resistance and are available from Electroflex of New Jersey. Other suitable heating pads may also be used. The variable heat resistors typically vary the temperature range of the heating pads from 85 degrees F. to 104 degrees F. although other suitable temperature ranges may be used. The heating pads are connected to the DC power supply 176 via wiring 185a-l with an example illustrated in FIG. 3.

In addition to access and heating pad control, the electrical circuit of the environmental control unit 40 may energize the four fluorescent, full spectrum habitat T-8 lights 112a-d, respectively, with a 34 Watt rating. As described above, these habitat lights 112a-d span the lateral width of each drawer 25a-d to position a portion of the light over each tank 118a-d, respectively, within the drawer to provide to the internal environment within each compartment. The habitat lights are electrically connected to the power source 174 and switch box 164 through an electronic ballast 182. When the habitat and display system 20 is plugged into the power source 174, closing the master fluorescent switch 166 with energize all of the full spectrum lights 112a-d.

Additional light and heat for each compartment 25 is supplied by a bank of twelve 110 VAC heat lamps 98a-l, respectively, having a 15-40 Watt range as desired. The heat lamps are also in electrical communication with the power source 174 and the master heat lamp switch 168 of the switch box 166. Each heat lamp includes its own individual control switch 158a-l as well. Closing all control switches 158a-l will energize all of the heat lamps 98a-l, respectively, if the power source 174 is on and the master heat switch 168 is closed. Individual of such heat lamps 98a-l may be turned off by opening the associated control switch 158a-l. In addition, opening the master heat lamp switch 168 opens the circuit and turns off all of the heat lamps 98a-l.

Usage of the Habitat and Display System:

In use, several convenient features of the animal habitat and display system will be appreciated. Referring to FIGS. 1 and 11-12, assuming initially that the animal habitat and display system 20 is plugged into an active wall outlet 174 and each the drawers 25a-d are initially closed as illustrated in FIG. 1 and all maglocks 181a-d (FIG. 12) including plates 88a-d (88a, 88c, and 88d not shown) coupled with corresponding plates 104a-d (FIG. 7), respectively, are activated so that each drawer is locked, the operator or animal care taker, store owner, employee or the like, must first gain authorized access to a particular drawer 25a-d to release the corresponding maglock 181a-d, respectively, using the keypad 154 on the control panel 38. For example, the store employee must first enter his or her employee code which is compared to the employee code listing stored in the keypad 154. Entry of a proper code by depressing the keypad keys 155 followed by selection of a drawer number (1-4), corresponding to drawers 25a-d, respectively, transmits current to the relay control 179 associated with the selected drawer to energize the relay 180a-d to demagnetize the maglock 181a-d so that the user may separate plate 88a (not shown) from plate 104a, for example, and pull the selected drawer 25a out on its guide rails 24a, 24b. Assuming the top drawer 25a is selected, the operator grasps the bottom edge of the front of the shelf 74a and pulls the drawer easily out away from the frame on the guide rails. The maglocks and keypad circuitry ensure only one drawer may be pulled out at a time or the display system 20 is sufficiently weighted so as to not fall over when one or more drawers are open. The maglocks are rated at 200-300 pounds pulling force to overcome their magnetic attraction and are available from Securitron of Reno, Nev., Camden of Canada, or Sprint in Hong Kong. Other suitable keyless entry methods such as those incorporating conventional biometric devices may also be used. Additional programming and computing power may be supplied by connecting a processing unit to the keypad.

After selecting a particular compartment 26a-c in the drawer 25a, for example, 26c, the operator simply pushes the front edge 149 of the lid 32c and slides the lid 32c in a rearward fashion along its respective guide rails 144 in relative to the bottom wall 122 of the compartment thereby enabling the animal care giver to reach into the compartment and internal habitat environment and place or retrieve an animal or other object. The other compartments in the same drawer may likewise be accessed. When the operator no longer requires access to any of the compartments in the drawer, with one hand the drawer 25a may be pushed rearwardly toward the frame 22. In closing, the rear bumper flange 146 (FIG. 5) of any open lids, such as lid 32c in this example, will bump into the bumpers 111, 113, and 115 of the opposing upper cross beam 106 driving the lid 32c along its rails 144 toward the front of the display system 20 thereby closing the lid and closing off the associated compartment 26c. It will be appreciated that only one hand is needed to perform the drawer closing and lid closing all in one motion. Upon closing the opposing maglocks components will reactivate locking the drawer 25a back in place. A store owner having a master code may verify the last entries of employees codes in the keypad to determine who had access. In addition, if an employee is terminated, no key lock must be changed out and the ex-employee code can easily be removed as a viable access code.

To control the internal environment of a compartment 26a-c in the top drawer 25a, for example, other than access, the operator may again use the control panel 38 (FIG. 11). In this example, the operator would initially switch the heat lamp master switch 168 to the on position to energize the heat lamps circuits. Then, depending on the particular tank, the operator would switch the particular heat lamp switch 158a-i to the on position to energize the associated heat lamp 98a-l. For instance, to turn the heat lamp on in compartment number three 26c, the operator would switch on heat lamp switch 158c. The heat lamp would then provide both heat and light to the internal environment of the compartment 26c. Other heat lamps may be activated in a like manner. Switching the master heat lamp switch 168 to the off position turns off all heat lamps.

The operator may also switch on all the fluorescent lamps 112a-d by merely switching on the master fluorescent lamp switch 166 on the control panel 38. Each fluorescent lamp lights up the internal environment of all the compartments 26a-c of a particular drawer 25a-d. Control of individual fluorescent lights is also contemplated.

If additional or alternative heat is needed, the operator may select a particular heating pad switch 160a-l on the control panel 38 and turns the switch to the desired setting. Variable current is supplied to the selected heating pad 162a-l to bring the heating pad to the selected temperature. The operator may view the in-tank thermometer 125 to determine if the heat setting is correct. The heating pad switch may be turned to the off position if no heat from the heating pad is required. While the above described embodiment provides environmental control for the animal habitat and display system 20, even more advance environmental control is contemplated as will now be described.

Figure 13:
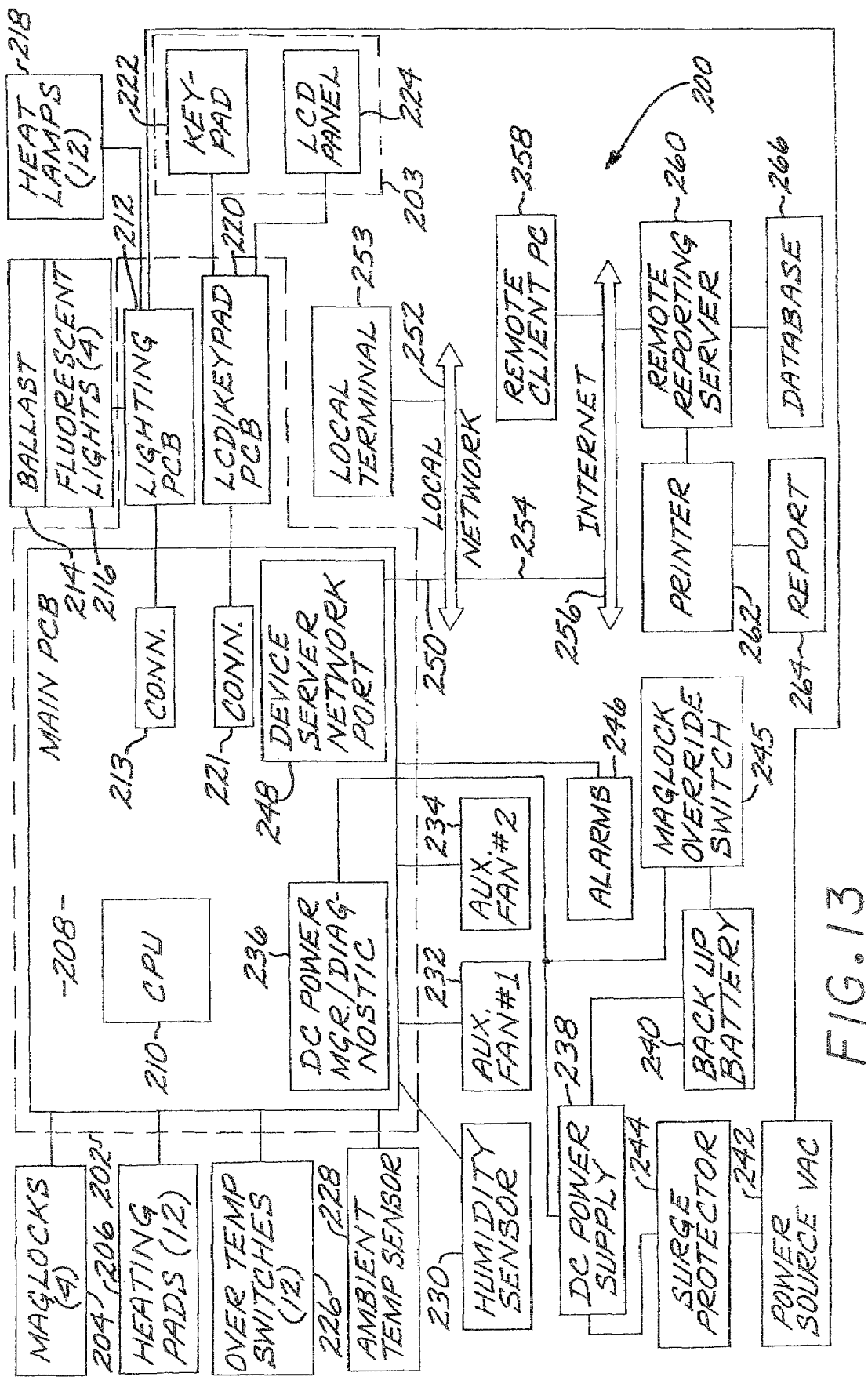
FIG. 13 is an exemplary block diagram of the environmental control system of a second embodiment of the present invention.

Automatic Control System and Usage:

Referring now to FIG. 13, a schematic diagram of a second exemplary embodiment of the animal habitat and display system, generally designated 200, is illustrated with sensory feedback and active controls for advanced environmental control. Such system 200 may also provide remote reporting capability as will be described below. The construction of the habitat and display system 200 is similar in construction to the habitat and display system 20 of the first embodiment except that the environmental control unit 202 and control panel 203 includes more sophisticated circuitry and is in electrical communication with a number of sensors to determine conditions both inside the compartment 26 and outside the compartment, e.g. the ambient temperature. As in the first embodiment, the magnetic locks 204 and heating pads 206 are hardwired to the environmental control unit (ECU) 202. However, the ECU 202 includes a main control printed circuit board (PCB) 208 with a programmable microprocessor (CPU) 210. The main control board is also in electrical communication with a second PCB, the lighting PCB 212 via connector 213. The lighting PCB 212 is hardwired to the ballast 214 and fluorescent lamps 216 for each drawer unit to transmit on/off signals to the fluorescent lamps and monitor the voltage of each lamp. In addition, the lighting PCB 212 hardwired to the 12 heat lamps 218 disposed in four set of three in the respective tray above each compartment as described above in the first embodiment. The lighting PCB 212 also transmits on/off signals to the heat lamps, either individually or as a group and monitors the voltage produced by each heat lamp.

With continued reference to FIG. 13, the main control PCB 208 is in electrical communication with another PCB, the LCD/KEYPAD PCB 220, via connector 221 which in turn is in electrical communication with the control panel 203. The LCD/KEYPAD PCB is hardwired to a keypad 222, constructed in a similar manner as described in the first embodiment, and an LCD panel 224, which may be a touch screen display; both cooperate to form the control panel 203 or may be used individually. A preferred LCD panel is available from Ampire. The LCD/KEYPAD PCB 220 may transmit input from the keypad 222 or LCD panel 224 to the main control PCB 208. In addition, the LCD/KEYPAD PCB 220 may transmit display signals or commands from the main control PCB 220 to the keypad or LCD panel for display. The PCB's described above are proprietary to North American Pet in Corona, Calif.

The main control PCB 208 is also hardwired to a set of 12 overtemperature switches 226, positioned in each tank, one of which may seen in FIG. 2. Preferred overtemp switches are digital and may be obtained from Sensidyne and may detect or sense temperature and also may be set to close a switch upon reaching a preselected temperature and upon the switch upon reaching a second preselected temperature. Analog switches may also be used. The main control PCB continuously or periodically takes readings from these overtemp switches which sense the temperature within each tank. If the temperature exceeds a preselected trigger point or set point, a shutdown sequence may be initiated as will be described below. The overtemp switches may also be directly wired into the heat lamp circuit and will open the circuit to turn of off the associated heat lamp if the trigger temperature point is reached. An ambient temperature sensor 228 is also hardwired to the main control PCB. A preferred ambient temperature sensor is available from Sensirion. The ambient temperature sensor is located on the display system to sense the temperature outside the tanks and generally surrounding the display system (FIG. 1). Alternatively, the ambient temperature sensor may be located away from the display system to take readings of the ambient temperature in other parts of the complex where the display apparatus is set up. A humidity sensor 230 may also be hardwired to the main control board 208 and is positioned in a similar manner to the ambient temperature sensor for detecting the local humidity outside of the tanks. As the ambient temperature may effect the internal environment in each compartment, the main control board receives input from the ambient temperature and may adjust accordingly. For example, if the ambient temperature is less than a preselected temperature such as 68 degrees for example, the heating elements may be adjusted upward to provide more heat the compartments. Likewise, if the ambient temperature is above a preselected temperature such as 85 degrees, then the heating components may be adjusted to transfer less heat into the compartments. The main control board may continuously or periodically monitor the ambient temp sensor 228 and adjust the heating and lighting components accordingly. The main control board may also initiate an alarm if the humidity sensor reading is too low or too high so the animal care taker can adjust the animal's environment accordingly.

It is also contemplated that an optional package may swap out the overtemp switches 226 with a combined temperature/humidity sensor which may be placed in each of the tanks and hardwired to the main control board 208 to provide temperature and humidity readings from each individual tank to the main control board 208.

Continuing with FIG. 13, an overtemp auxiliary fan 232 is hardwired to the main control board 208. This overtemp fan is mounted on the rear section of the frame opposing the bottom drawer (FIG. 7) to draw air across from the front of the display rack 20 through the vents 233 on the front bottom panel 63 and out the rear of the open frame 22. Although the overtemp fan is illustrated on the bottom rack, it will be appreciated that a fan may be mounted to the frame behind each drawer to drawer cooler air, indicated by direction arrows, 235, through vents 233 in the front of the display system across trays 74a-d and heat lamps 98a-l and out the open back of the tray or shelf, as indicated by directional arrows 237, through the fan 232 in the direction of arrow 239 to remove undesirable high temperature air from the drawer and tank environments (FIG. 2). The fans described herein may be obtained from Comair Rotron.

If amphibians are placed in the habitat and display system, such animals are typically placed on the bottom rack as they require a cooler environment and such placement keeps them out of the rising higher temperature air. Referring now to FIGS. 7 and 13, a second auxiliary fan 234, primarily used to assist in keeping the temperature of the lower drawer 25d cooler than those drawers above the bottom drawer, is illustrated. Such fan 234 is hardwired to the main control board 208 and may run frequently to draw cool air from the front of the habitat and display system underneath the bottom of the lower drawer and out the back of the unit. If animals placed in the bottom drawer compartments do not require lower temperature requirements, then the second auxiliary fan 234 may be used sparingly or as a complement to the first auxiliary fan in cooling down the air in the tank environments.

With continued reference to FIG. 13, the main control board 208 of the ECU 202 includes a DC power management and diagnostic control unit 236. This DC power unit is hardwired to a source of DC power, indicated schematically at 238, which may be a 5, 12, and/or 24 VDC source to supply power to the heating pads 162a-l, fans 232, 234, and magnetic locks 204. The diagnostic unit may monitor voltage of the DC components to determine if the components are working properly and report the findings to the main control board for reporting purposes and to generate error condition, warnings, or alarms.

In addition, if the DC power supply shuts down for any reason, a backup 24 VDC battery 240 supplies power to the system 200. The fluorescent lights 216 and heat lamps 218 are powered by a conventional power source such as wall outlet 242 supplying AC power. The power source also is connected to a surge controller 244 to control voltage spikes and the like from harming the circuitry of the ECU 202. A maglock override switch 245 is connected to the backup battery and DC power supply. Such switch will close if the DC power supply fails and does not turn back on after a preselected time limit to transmit a signal to the main control board 208 to open the magnetic locks after the preselected time. This allows the animal care takers to remove the animals from the tanks if necessary after otherwise securing the environment around the habitat and display system 200. Also, if the main PCB fails, the maglocks may be programmed to automatically lock at least for a designated time period to deter theft.

It will be appreciated that the incorporation of the PCB's reduces the amount of wiring required for each of the heating and lighting components thus reducing the overall heat of the system 20.

For warning purposes, an alarm 246, which may provide either visual or aural stimulus, is hardwired to the main control board will transmit an alarm signal if a critical state is reached in any of the tank environments as determined by the CPU 210 from input readings of the various sensors 226, 228 and heating pad 206 and light 216, 218 status.

The main control board 208 of the ECU 202 is also constructed with a device server board 248 that plugs into the main control board. Such device server board includes a port for connecting via a communication line 250 to a local network 252 such as an ethernet or local access network (LAN). A preferred device server board is available from Lantronics of Irvine, Calif. At least one terminal 253 or desktop computer laptop is connected to the local network. The local network is then connected via a second communication line 254 to a global network, represented in FIG. 13 as the Internet 256. The store owner may also have a personal computer or store computer 258 connected to the Internet to receive messages from the reporting server 260 in communication with the remote client computer over the Internet. The remote reporting server compiles diagnostic data from the ECU 202 for each tank environment and associated control items and sensors. The server is connected to a printer 262 for printing out hard copy reports 264 and a database 266 for storing the diagnostic history of each tank. The remote reporting server may be managed by a central service charging a subscription fee for the reporting service or as a built-in cost of the habitat and animal display apparatus.

When ready to use, the habitat and display system is connected to a power source 242 so that power may be supplied to the lighting components and the DC power supply 238 is activated to supply power to the maglocks 204, heating pads 206, and fans 232, 234. The ECU 202 is also supplied with power. The surge protector 244 inhibits voltage spikes from damaging the system while the back-up battery 240 goes into standby mode.

It will now be appreciated with the following description that the ECU 202 may be used to individually control the internal environment 34 of each tank 118, including both lighting and temperature, by setting the lighting and temperature parameters for each tank. The ECU then continuously or periodically monitors each tank and the system components for error conditions. If an error condition arises, as determined by the ECU 202, the ECU will generate a response to either correct the situation and/or alert the display operator that an error condition exists and must be addressed or the health of an animal in the habitat and display system may be jeopardized.

As the comfortable temperature range of different animals varies, the operator must first input the desired temperature for each tank 118. For example, most reptiles and amphibians are comfortable within a temperature range of 85 degrees to 104 degrees with the amphibians preferring the lower end of the range. In this example the tanks are numbered left to right starting with the top drawer 25*a*. Using the keypad 222, the operator may depress the key representative of the tank in which the temperature is to be set. It will be appreciated that the LCD panel 224 is an alternative input means for transmitting input through the LCD/KEYPAD PCB 220 to the main control board 208. In this example, the operator selects tank "1" by depressing the number "1" on the keypad 222 (and FIG. 11) and then entering the temperature setting, for example 85 degrees using the keys as well. The star or pound sign may be used to indicate send. The keypad sends the inputted keystrokes signals to the LCD/KEYPAD PCB 220 which in turn transmits the tank and temperature setting to the main control board 208. The main control board then sends a control signal to the heating pad 162*a-l*, respectively, associated with the selected tank to vary the resistance of the variable temperature heating pad setting the heating pad at the desired temperature as selected on the keypad.

Other tanks may be selected and the temperature set in a similar manner. When the temperatures of all the tanks to receive animals have been set, the system 200 is allowed to stabilize. During this time, the main control board receives measured temperature readings from each tanks overtemp switch 226. The user may check the temperature in each tank using the in-tank thermometer 125 or alternatively using the LCD panel 224 to call up a tank and associated temperature display which may be a number or a graphical representation of the temperature.

The lighting may be controlled in a similar manner. The LCD panel may also be used to select with heat lamps 218 are turned on for each tank and fluorescent lamps 216 are turned on for each drawer 25. The lighting switch bank 158 as described above for the first embodiment may be used alternatively.

Assuming the temperatures stabilize, the animals are placed in their respective tanks and cared for in conventional fashion as described above for the first embodiment. As temperature conditions outside the tank may vary or the temperature regulating components may fail, the ECU continually or periodically monitors the temperature conditions of each tank via the in-tank overtemp switches 226.

More specifically, the main control board 208 of the ECU 202 may receive sensor readings from the in-tank sensors 226 measuring the environmental parameter of temperature to determine if the temperature in a particular tank 118 is in an overtemp condition and thus the internal environment of the associated tank is unsuitable for the animal. The readings sent to the CPU 210 which is programmed to compare the temp switch 225 measurements with the preselected temperature setting. Readings taken by the main control board 208 from the ambient temperature sensor 228 and ambient humidity sensor 230 are also taken into account when determining if a critical condition exists.

For example, if both amphibians and reptiles are situated in the tank environments, the desired temperature setting within a particular tank may vary from about 85 degrees to about 104 degrees. These temperatures represent an exemplary low set point (85 degrees) and a high set point (104 degrees). If temperature conditions as sensed by any of the overtemp switches 226 fall outside this range, a sequence of events is triggered. At the simplest level of response, the main control board 208, upon detecting a temperature range error from the in-tank temp sensors 226, transmit a command signal to the alarm 246 to actuate a visual or aural stimulus to draw the operator's attention to the habitat and display system 200. The operator, upon receiving the alarm, may investigate the source of the problem by checking the environmental parameters for each tank internal environment using the in-tank thermometer 125 or LCD panel 224 environmental readout which may be a text or graphical display representing the temperature of each tank as well as the power status of the DC components including the maglocks 204, heating pads 206, and fans 232 and 234. The operator may fix the situation or remove the animal from the affected tank environment.

The ECU 202 may also provide a more advanced level of response in the form of a shutdown sequence, particularly for overtemp conditions. If, for example, the overtemp switch 226 detects an overtemp condition, i.e. an internal tank environment temperature over 104 degrees in this example, the switch will close transmitting a signal to the main control board 208 that a particular tank has reached an overtemp condition. The main control board 208 will send a command signal to the auxiliary fan 232 to turn on to begin drawing air from the front of the display system toward the back of the system in an attempt to generate a cooler air flow through the system. The main control board 208 will continue to monitor the overtemp switch which is selected to open upon reaching a temperature of 85, in this example. If the overtemp switch 226 has not opened with a certain time period, for example, one minute, the main control board will actuate the second auxiliary fan 234 in a similar manner and continue to take temperature parameter measurements of the tank having an internal environment in critical condition.

The next step in the shutdown sequence is for the main control board 208 to turn the heat lamp 218 of the problem tank off by transmitting an off command signal to the lighting control board 212, which in turn opens the circuit of the selected heat lamp to turn the lamp off. The next step in the shutdown sequence is to turn the heat pad 206 in the problem tank off followed turning all heat pads 206 for the entire system off. The fluorescent lights are then turned off per drawer or in their entirety. Between each of these steps, it will be appreciated that the main control board 208 takes temperature readings from the overtemp switch 226 in the problem tank. If the temperature drops below a preset value, for example, 85 degrees, the next step of the shutdown sequence is not taken. If all steps are taken, the main control board will actuate the alarms, both visual and audible to alert the operator. Alternative shutdown procedures will occur to one of ordinary skill in the art.

It will be appreciated that in case of a power outage wherein the AC power supply 242 is unavailable effecting the DC power supply 238, a battery back up 240 activates to provide power to the DC components such as the maglocks 204, heating pads 206 and fans 232, 234. The battery back-up may last for about 20 minutes. While the light components will be deactivated, the animals will still receive some heat from the heating pads 206 and the fans may be activated if an overtemperature condition is detected by the main control board 208. In addition, the maglocks 204 may be opened using the control panel 203 so an operator can open a particular drawer 25 to gain access to the animal if desired. If the battery backup unit 240 fails, a maglock override switch 245 closes sending a signal to the main control board 208 to send an open command signal to the maglock 204 after a predetermined time period. Thus, the operator may access and handle the animals if necessary to prevent harm to the animals or complete a sale.

Remote Reporting:

Remote reporting entails noticing a store owner, veterinarian, or other animal care taker, not currently on-site with the animal habitat and display apparatus, that a serious environmental condition exists in at least one the tanks. Such remote reporting may be provided by a central administrative device manager also at a remote location via a subscription service or as a built-in cost to the display unit. It will be appreciated that remote reporting of error conditions occurring in the animal habitat and display system is advantageous as the animals are often left unattended during closing hours and since ambient temperature frequently varies throughout the night and day which may severely effect the conditions of the animal habitat when no one is in attendance. Thus, the on-site alarms may not be seen until the open of business hours later. In addition other conditions such as power outages, fire, flooding, and other environmental hazard conditions may effect the environment in which the animals live and require a rapid response to preserve the health of the animals.

It is also common practice for a manager to be responsible for a region and thus a number of stores or in the case of veterinarian animal care taker, away from the clinic where the animals are located. Thus, the present invention contemplates a remote reporting feature to alert the animal care takers at a remote location over a communication network using email or the Internet, or alternatively via telephone or paging service via landline or wireless communication.

For example, with continued reference to FIG. 13, if an error condition, such as an overtemp condition or component failure, is detected by the main control board 208, a signal indicating the error condition, location of the error, i.e. tank or component, and street address of the animal display or other suitable location identifier is sent to the device server/network port 248 which is connected to the local network 252 via communication line 250. Alternatively, the network port could be connected directly to the Internet using TCP/IP and conventional communication hardware and software. Each habitat system would be assigned a unique port address to identify its location. The error message is transmitted across the local network lines to a local terminal on-site. Thus, a manager may locate the terminal in his or her office away from the display system and still receive error messages and alarm notifications over the network.

As the store manager or animal care taker may not be on-site at all during an error condition, the error message may be transmitted to remote reporting server 260 which gathers the error data and stores it in a database 266 for historical analytical purposes. An error printout 264 may be generated using the printer 262. The animal care taker may then be notified by the reporting service through any of the various communication means including email to the remote client's personal computer 258 also connected to the Internet. The remote reporting service provide may also access the animal care taker's contact information including phone number or pager number in the database and contact the animal care taker in a corresponding fashion.

For example, the main control board 208 detects via the overtemp switch 226 that tank No. 1 is in an overheat condition while the store where the animal habitat and display apparatus is unattended. After the shutdown sequence is initiated and the alarms 246 triggered, the main control board sends an error signal indicating that tank No. 1 is an overheat condition, the shutdown sequence did not terminate the condition, and the store location identifier to the network port 248. The error signal is transmitted over communication line 250 to the local network and communication line 254 to the Internet and is received by the remote reporting server 260 of the remote reporting service. The remote reporting server may then store the information in the database 266 and also transmit an email notification containing the error message to the remote client PC 258. The animal care taker, upon receiving the email, may then travel to the location of the animal habitat and display system 200 and investigate the error. The remote reporting may also use the diagnostic feature and inform clients of any component failures.

While the present invention has been described herein in terms of a number of preferred embodiments for display animals or objects, various changes and improvements may also be made to the invention without departing from the scope thereof.

For example, while the present embodiments have been described in terms of animal habitats and displays, and particularly, reptiles and amphibians, the present invention also contemplates providing a habitat for other types of animals and alternatively may be used as storage and display device for inanimate objects as well. In addition, while the lighting components were described primarily in terms of fluorescent lamps, it will be appreciated that other lighting components such as incandescent lamps, infrared lamps, and ultraviolet lamps may be used as well. Also, the heat transfer component may be selected from incandescent lamps, radiant heat lamps, infrared lamps, ceramic heat emitters, black lights, heating pads, hot rocks, heat tape, and/or undersubstrate hot blocks. Such lighting and heat transfer components may be used together or separately in any combination to contribute to the environmental control of the compartments as necessary.

What is claimed is:

1. An animal habitat and display system comprising:
   an enclosure defining a compartment with a viewing window for housing and displaying at least one animal;
   an access panel defining at least a portion of said enclosure in a closed position and movable relative to said enclosure to an open position for gaining entry into said compartment; and
   a frame including at least one support element supporting said enclosure, said support element being movable relative to said frame between a first position preventing access to said access panel and a second position providing access to said access panel, said frame being constructed to urge said access panel from said open position toward said closed position when said support element is moved from said second position toward said first position.

2. The animal habitat and display system as set forth in claim 1 wherein:
   said support element includes at least one guide rail movable from said first position to dispose said enclosure within the confines of said frame when said guide rail is fully retracted and to said second position extending said guide rail to dispose said enclosure at least partially outside said frame exposing said access panel.

3. The animal habitat and display system as set forth in claim 2 wherein:
   said enclosure is in the form of a tank; and
   said support structure includes a shelf supporting said tank from said at least one guide rail.

4. The animal habitat and display system as set forth in claim 2 wherein:
   said guide rail is telescopically extendible.

5. The animal habitat and display system as forth in claim 1 wherein:
said enclosure includes a set of walls defining said compartment with a leading edge; and
said access panel being openable to create an access area into said compartment proximate said leading edge of said compartment.

6. The animal habitat and display system as set forth in claim 5 wherein:
said access panel is slidably mounted on said enclosure and moves in a direction parallel to at least one wall of said set of walls.

7. The animal habitat and display system as set forth in claim 1 wherein:
said access panel includes a set of perforations operable to exchange air between said compartment and a surrounding area.

8. The animal habitat and display system as set forth in claim 1 wherein:
said support element includes a tray mounted on at least one guide rail and supporting said enclosure.

9. The animal habitat and display system as set forth in claim 1 wherein:
said access panel is coupled to said enclosure by a pair of opposing slide tracks.

10. The animal habitat and display system as set forth in claim 1 wherein:
said frame includes a plurality of enclosures arranged in a vertically stacked relationship with one of said enclosures occupying an uppermost position; and
said uppermost enclosure is covered by a frame cover element spanning across said frame when said uppermost enclosure is in said first position.

11. The animal habitat and display system as set forth in claim 1 wherein:
said access panel is a top wall of said enclosure, said top wall being slidably movable relative to a bottom wall of said compartment for gaining access thereto.

12. The animal habitat and display system as set forth in claim 1 wherein:
said frame is constructed to remain in contact with a trailing edge of said access panel during movement of said support element from said second position to said first position.

13. The animal habitat and display system as set forth in claim 1 wherein:
said access panel is operable to be partially opened when said support element is between said first and second positions.

14. The animal habitat and display system as set forth in claim 1 wherein:
said frame includes a bumper element cooperating with a trailing edge of said access panel to urge said access panel through continuous contact into a closed position as said support element is moved from said second position to said first position.

15. The animal habitat and display system as set forth in claim 1 wherein:
said support element includes a tray supporting said enclosure with said enclosure constructed to receive animal litter, said support element including a set of opposing guide rails coupled to said tray with each of said guide rails having a respective outermost lateral edge extending past the respective lateral edges of said tray.

16. The animal habitat and display system as set forth in claim 15 further including:
a first guard rail guard positioned above one of said guide rails and a second guide rail guard positioned above the other of said guide rails, said guide rail guards each including a first portion extending laterally from said tray a distance equal to or beyond said outermost lateral edge of said corresponding guide rail disposed thereunder to prevent said animal litter from entering at least a portion of said guide rail from above with said guide rails in an extended or retracted position.

17. An animal display and habitat system comprising:
an enclosure defining a rectangular compartment with a viewing window for housing and displaying at least one animal;
an access panel defining at least a portion of said enclosure in a closed position and slidably movable relative to said enclosure to an open position for accessing said compartment;
a frame having at least one pair of opposing telescopically extending support elements, said support elements being extendable and retractable relative to said frame between a first position concealing said access panel and a second position revealing said access panel, said frame being constructed to drive said access panel from said open position to said closed position as said support element is moved from said second position to said first position; and
a shelf coupled to said frame by said support element, said shelf including an outwardly projecting debris guard mounted on said shelf above said support element to prevent debris from entering said support element from above.

18. An animal habitat and display system comprising:
a frame supporting a plurality of opposing guide rail sets extendible between a retracted position and a fully extended position with said guide rail sets including a pair of inner and outer tracks with respective innermost and outermost lateral edges;
a shelf positioned between and coupled to each of said guide rail sets and supporting an enclosure having an access panel, said shelf including lateral outermost edges spaced interior to said innermost edges of inner tracks of said guide rail sets;
a first guard rail guard positioned above one of said guide rails and a second guide rail guard positioned above the other of said guide rails for each guide rail set, said guide rail guards each including a first portion extending laterally from said shelf a distance equal to or beyond said outermost lateral edge of said inner track of said corresponding guide rail disposed thereunder to prevent debris falling from above from entering at least a portion of said guide rail as said guide rail sets move between said fully extended or retracted position.

19. The animal habitat and display system as set forth in claim 18 wherein:
said guide rail guards each include a first portion extending laterally from said shelf a distance equal to or beyond said innermost lateral edge of said outer track of said corresponding guide rail disposed thereunder to prevent debris falling from above from entering at least a portion of said guide rail as said guide rail sets move between said fully extended or retracted position.

20. The animal habitat and display system as set forth in claim 18 wherein:
said frame includes a pair of forwardly disposed spaced apart uprights;
said first portion of said first and second guard rail extends laterally from said shelf a distance equal to or beyond said outermost lateral edge of said outer track of said corresponding guide rail disposed thereunder and less than the innermost edge of said uprights to prevent debris falling from above from entering at least a portion of said guide rail as said guide rail sets move between said fully extended or retracted position.

* * * * *